United States Patent
Frait et al.

(10) Patent No.: US 9,784,353 B2
(45) Date of Patent: Oct. 10, 2017

(54) TORQUE CONVERTER HAVING VARIABLE PITCH STATOR AND BYPASS CLUTCH

(71) Applicant: Ford Global Technologies, LLC, Dearborn, MI (US)

(72) Inventors: Steven Anatole Frait, Milan, MI (US); Vincent Patrick LaVoie, Canton, MI (US); Norman Jerry Bird, Plymouth, MI (US); John Edward Brevick, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 125 days.

(21) Appl. No.: 14/978,198

(22) Filed: Dec. 22, 2015

(65) Prior Publication Data

US 2016/0116044 A1    Apr. 28, 2016

Related U.S. Application Data

(63) Continuation-in-part of application No. 14/457,265, filed on Aug. 12, 2014, now Pat. No. 9,689,492.

(51) Int. Cl.
| | |
|---|---|
| *F16H 45/02* | (2006.01) |
| *F16H 61/14* | (2006.01) |
| *F16H 41/26* | (2006.01) |
| *F16H 61/56* | (2006.01) |

(52) U.S. Cl.
CPC ............ *F16H 45/02* (2013.01); *F16H 41/26* (2013.01); *F16H 61/14* (2013.01); *F16H 61/56* (2013.01); *F16H 2045/021* (2013.01)

(58) Field of Classification Search
None
See application file for complete search history.

(56) References Cited

U.S. PATENT DOCUMENTS

| | | | |
|---|---|---|---|
| 1,129,720 A | 2/1915 | Patterson | |
| 2,382,034 A | 4/1932 | Wemp | |
| 2,389,174 A | 11/1945 | Whitworth | |
| 2,400,622 A | 5/1946 | Althoff | |
| 2,501,771 A | 3/1950 | Gray | |
| 2,871,792 A | 2/1959 | Mead | |
| 2,909,034 A | 10/1959 | Jandasek | |
| 2,929,214 A | 3/1960 | Stump et al. | |
| 2,944,402 A | 7/1960 | Russell | |
| 2,944,441 A | 7/1960 | Russell | |
| 2,995,955 A * | 8/1961 | Kelley | F16H 41/26 475/40 |

(Continued)

FOREIGN PATENT DOCUMENTS

JP           08114262 A     5/1996

*Primary Examiner* — Jacob S Scott
*Assistant Examiner* — Timothy M Hannon
(74) *Attorney, Agent, or Firm* — James Dottavio; Brooks Kushman P.C.

(57) ABSTRACT

A transmission includes a torque converter stator with controllable blade angle. A controller adjust the blades by commanding fluid pressures in hydraulic circuits routed to the stator hub. The controller also adjust the torque capacity of a torque converter bypass clutch by commanding fluid pressures in hydraulic circuits routed to apply and release chambers. Various schemes are presented to multiplex hydraulic circuits to serve multiple functions.

14 Claims, 15 Drawing Sheets

(56) References Cited

U.S. PATENT DOCUMENTS

| | | | |
|---|---|---|---|
| 3,886,729 A * | 6/1975 | Amann | B60K 3/04 |
| | | | 60/332 |
| 4,047,383 A | 9/1977 | Johnson et al. | |
| 5,307,629 A | 5/1994 | By et al. | |
| 6,217,476 B1 | 4/2001 | Mueller et al. | |
| 7,500,548 B2 * | 3/2009 | Kimes | F16D 41/12 |
| | | | 192/46 |
| 8,991,578 B2 | 3/2015 | Tanaka et al. | |
| 8,997,956 B2 | 4/2015 | Iwase et al. | |
| 2015/0114779 A1 | 4/2015 | Frait et al. | |

* cited by examiner

TORQUE CONVERTER HAVING VARIABLE PITCH STATOR AND BYPASS CLUTCH

CROSS-REFERENCE TO RELATED APPLICATIONS

This application is a continuation-in-part of U.S. application Ser. No. 14/457,265 filed Aug. 12, 2014, now U.S. Pat. No. 9,659,492, issued Jun. 27, 2017, the disclosure of which is hereby incorporated in its entirety by reference herein.

TECHNICAL FIELD

This disclosure relates to the field of automotive transmissions. More particularly, the disclosure pertains to a torque converter having a variable pitch stator.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Even with a very high speed ratio selected, the gearbox input speed is zero when the vehicle is stationary. Since an internal combustion engine is incapable of generating torque at zero shaft speed, some type of launch device is typically employed between the engine and the gearbox input shaft. A common launch device for automatic transmissions is a fluid coupling. A fluid coupling is a hydrodynamic torque transfer device having an impeller and a turbine in a torus shape surrounding the transmission axis. When the impeller rotates faster than the turbine, the impeller causes fluid to rotate in the torus exerting torque on the turbine and a resistance torque on the impeller. A torque converter is a fluid coupling that also includes a stator that is held against rotation. The stator redirects the flow such that the torque applied to the turbine is greater than the resistance torque on the impeller. When the vehicle is stationary, the turbine is also stationary but the impeller may be coupled to the engine crankshaft. Due to the speed difference between impeller and turbine, the impeller resists rotation of the crankshaft. The resistance torque is small enough that it does not stall the engine. However, the engine must consume additional fuel, beyond that required for unloaded idle, in order to overcome the resistance torque. A multiple of the engine torque is transmitted to the gearbox input which is coupled to the turbine.

SUMMARY OF THE DISCLOSURE

A transmission includes a torque converter, a clutch, and an actuator. The torque converter includes an impeller, a turbine, and a stator having a plurality of blades. The clutch is configured to selectively couple the turbine to the impeller in response to a pressure difference between a first chamber and a second chamber. The clutch may include a piston coupled to the turbine and a return spring biasing the piston towards a disengaged position. The actuator is configured to adjust an orientation of the blades in response to a pressure difference between a third chamber and a fourth chamber. The third chamber may be fluidly connected to the impeller at an inner diameter while the first chamber is fluidly connected to the impeller at an outer diameter. The second chamber may be fluidly connected to the fourth chamber. The transmission may also include a valve body configured to adjust the first pressure difference and, while the clutch is commanded to a disengaged state, adjust the second pressure difference.

A torque converter includes an impeller, a turbine, a stator, an actuator, and a clutch. The actuator is configured to adjust an orientation of the blades in response to a first pressure difference between a tightening chamber and a loosening chamber. The clutch is configured to selectively couple the turbine to the impeller in response to a second pressure difference between an apply chamber and a release chamber. The tightening chamber may be fluidly connected to an inner diameter of the impeller while the apply chamber is fluidly connected to an outer diameter of the impeller. The loosening chamber may be fluidly connected to an inner diameter of the impeller while the apply chamber is fluidly connected to an outer diameter of the impeller. The loosening chamber may be fluidly connected to an inner diameter of the turbine while the apply chamber is fluidly connected to an outer diameter of the turbine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
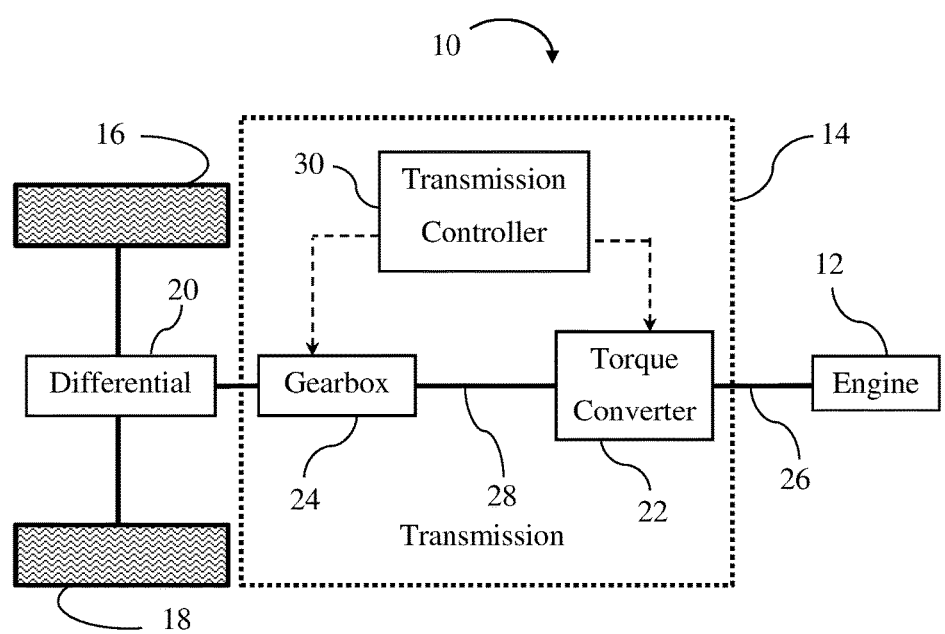
FIG. 1 is a schematic diagram of an exemplary vehicle powertrain.

FIG. 1 schematically illustrates a vehicle powertrain 10. The heavy lines indicate the flow of mechanical power, whereas the dashed lines indicate the flow of information. An internal combustion engine 12 generates mechanical power by converting stored chemical energy in a fuel source. Transmission 14 adapts the speed and torque of the mechanical power produced by the engine to suit the current needs of the vehicle. Mechanical power from transmission 14 is routed to left and right wheels 16 and 18 by differential 20. Differential 20 provides roughly equal torque to each wheel while accommodating slight differences in speed such as when the vehicle turns a corner. In a rear wheel drive vehicle layout, the differential also changes the axis of rotation by roughly 90 degrees and adjusts the speed and torque by a fixed final drive ratio. In a front wheel drive configuration, the differential may be integrated into the transmission, which may be called a transaxle.

The transmission 14 includes two power transfer stages, a torque converter 22 and a gearbox 24. The torque converter transmits power and torque from transmission input shaft 26 to turbine shaft 28. The gearbox 24 provides a number of speed ratios including multiple forward speed ratios and at least one reverse speed ratio. Gearbox 24 may include a number of controllable clutches that are engaged in various combinations to establish various fixed speed ratios. Alternatively or in combination, gearbox 24 may include a variator capable of establishing any speed ratio between fixed limits. The variator and clutches respond to commands from transmission controller 30. These commands may be conveyed, for example, by adjusting an electrical current which, in turn, adjust a pressure of a fluid in a piston apply chamber. Transmission controller 30 may be a dedicated controller or its functions may be integrated into another controller in the vehicle such as a powertrain controller.

Figure 2:
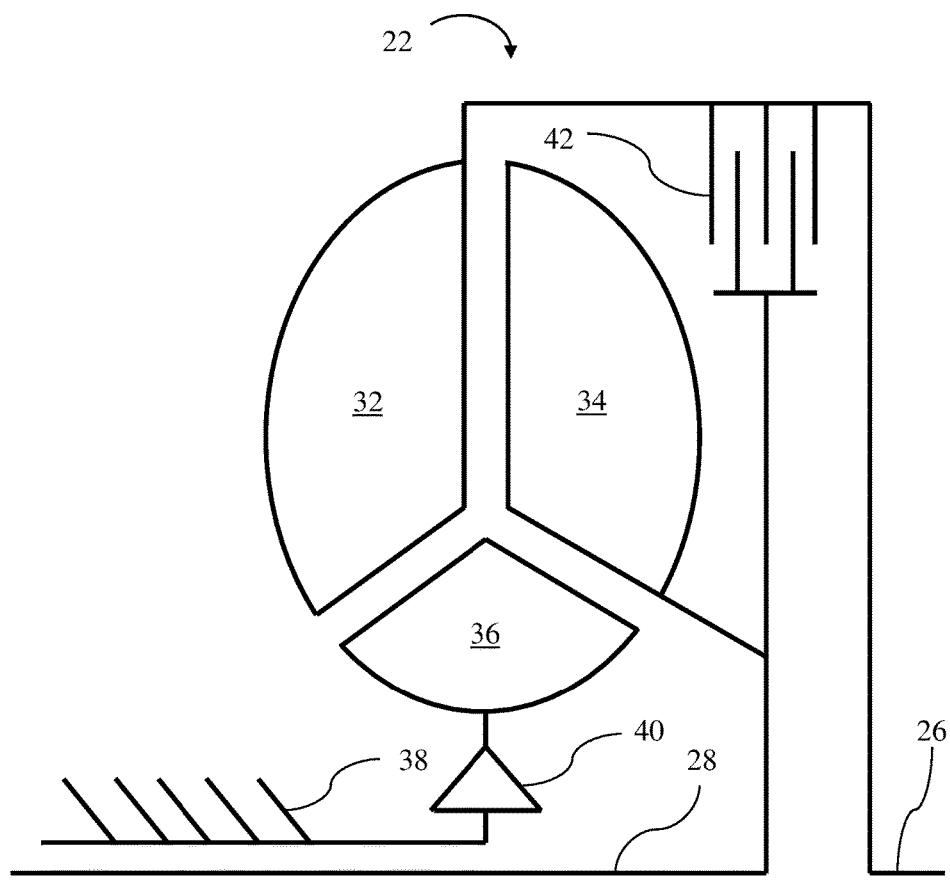
FIG. 2 is a schematic illustration of an exemplary torque converter.

FIG. 2 schematically illustrates torque converter 22. Torque converter 22 provides two parallel power flow paths from transmission input shaft 26 to turbine shaft 28. A hydrodynamic power flow path includes impeller 32 and turbine 34. Impeller 32 is fixedly coupled to transmission input shaft 26 which is adapted for fixation to an engine crankshaft. Turbine 34 is fixedly coupled to turbine shaft 28. Stator 36 is coupled to transmission housing 38 by passive one way clutch 40. At low turbine shaft speeds, impeller 32 causes fluid to flow around the torus from impeller 32 to turbine 34 to stator 36 and back to impeller 32. Stator 36 is held against rotation by one way clutch 40 such that it can redirect the flow and provide a reaction torque for torque multiplication. As the speed of turbine 34 approaches the speed of impeller 32, fluid in the torus flows circumferentially around the input shaft with the impeller and turbine. One way clutch 40 then overruns such that stator 36 can rotate rather than impeding this flow. Transmission input shaft 26 is selectively coupled to turbine shaft 28 by bypass clutch 42 providing a second power flow path.

Power flow through the hydrodynamic power flow path is governed by the speed of impeller 32 and the speed of turbine 34. The relationship between the speeds and the torques is a complex function of torus geometry and of the blade angles of the impeller, turbine, and stator. At a constant turbine speed, both impeller torque and turbine torque increase as impeller speed increases. A torque converter designed to exert a higher resistance torque on the impeller at a given impeller and turbine speed is called a stiffer or tighter converter, whereas a torque converter designed to exert a lower torque for the same impeller and turbine speed is called a looser converter. The stiffness of a torque converter may be expressed as a K-factor or capacity characteristic that relates the impeller torque to the impeller speed. A low K-factor indicates a tight converter while a high K-factor indicates a loose K-factor. The ratio of turbine torque to impeller torque generally increases as the ratio of impeller speed to turbine speed increases. However, based on conservation of power, the torque ratio is never greater than the speed ratio. The product of the speed ratio and the torque ratio is the converter efficiency, which varies between zero and one as a function of impeller speed and turbine speed. The torque ratio when the turbine is stationary is called the stall torque ratio. Torque converter design often involves compromises between achieving the desired stiffness, maximizing efficiency, and maximizing torque ratio. The most advantageous combination of properties differs for different vehicle operating conditions.

When the vehicle is stationary and gearbox 24 is engaged, turbine 34 will also be stationary. The engine and impeller 32 rotates at the engine idle speed. The resistance torque exerted by the impeller on the engine requires the engine to consume more fuel to stay at idle speed than would be necessary if the engine was unloaded. To minimize the idle fuel flow rate, a looser converter is preferable in this operating condition.

When a driver wants to accelerate as quickly as possible from a stationary condition, different torque converter properties may be important. The torque exerted on the turbine is equal to the product of the engine torque and the torque converter stall torque ratio. Consequently, a high stall torque ratio is important. A high stall torque ratio may permit a lower transmission gear ratio in first and reverse gears, a reduction in the number of distinct transmission ratios, reduced spacing between the ratios, a reduction in the final drive ratio, or some combination of the above. The torque that an internal combustion engine is capable of producing may be a function of the engine speed. For a turbocharged engine, the maximum torque may not be available until after the engine has operated at that speed for several seconds. A torque converter that is too stiff will not permit the engine speed to rise to the speed at which it generates its maximum torque, so a looser converter may be desired. Once the vehicle starts to move, the turbine shaft speed increases. As the turbine shaft speed increases, the impeller speed tends to also increase and the torque ratio tends to drop. As the impeller speed increases, the engine speed will eventually exceed the maximum torque speed and continue increasing toward the engine redline speed. At that point, gearbox 24 must upshift to a lower speed ratio (higher numbered gear) which decreases transmission output torque. If the torque converter is too loose, the upshift point is reached too quickly. Therefore, the converter stiffness must be carefully tailored to the engine torque and speed characteristics over a range of converter speed ratios.

A torque converter with appropriate characteristics may reduce the likelihood that vehicle occupants will be annoyed when gearbox 24 shifts from one speed ratio to another. During an upshift from a high gearbox speed ratio to a lower gearbox speed ratio, the speed of turbine shaft 28 decreases. The speed of impeller 32 and the engine also decrease, but by proportionately less than the turbine shaft speed decreases. The rate at which the engine speed drops to the new value depends on the stiffness of the converter. Since the torque converter speed ratio increases, the torque converter torque ratio may also increase partially offsetting the decrease in gearbox torque ratio. Since the engine speed and transmission output torque change by less than they would with bypass clutch 42 engaged, the shift is less noticeable to vehicle occupants. Furthermore, shifting gearbox 24 may require the carefully coordinated engagement of one friction clutch and release of another friction clutch. Even when performed well, some torque fluctuations are unavoidable. The torque converter tends to absorb energy from these fluctuations and prevent vibration of powertrain components that may otherwise result.

When the vehicle is cruising at moderate speeds, the power required is generally low and fuel efficiency is important. Often, bypass clutch 42 may be engaged during cruise to transmit the engine torque to the turbine shaft with very high efficiency. However, in some conditions, especially at lower speeds with high gearbox speed ratios, bypass clutch 42 may be disengaged because the torsional vibration isolation provided by the hydrodynamic power flow path is needed. In these circumstances, torque converter efficiency is very important. An excessively loose converter will permit too much speed difference between the engine and the turbine shaft, lowering efficiency. Also, a larger speed difference between the engine and the turbine shaft makes the transition from the hydrodynamic power flow path to bypass clutch 42 more difficult to execute smoothly which increases the percentage of time that the bypass clutch 42 is disengaged.

As described above, the optimum torque converter characteristics differ among different operating conditions for a particular vehicle. Selection of a torque converter with fixed characteristics requires compromises among these operating conditions. A torque converter that has variable characteristics which can be actively controlled permits selection of characteristics that are more suitable for each operating condition. One way to vary the torque converter characteristics is to change the blade angle of the blades in the stator. However, in order to reduce the space required, a current trend in torque converter design is to make the stator very narrow. This trend reduces the axial length available to accommodate a mechanism for changing the stator blade angle. This packaging constraint is exacerbated by the need to package a one way clutch in the same area.

Figure 3:
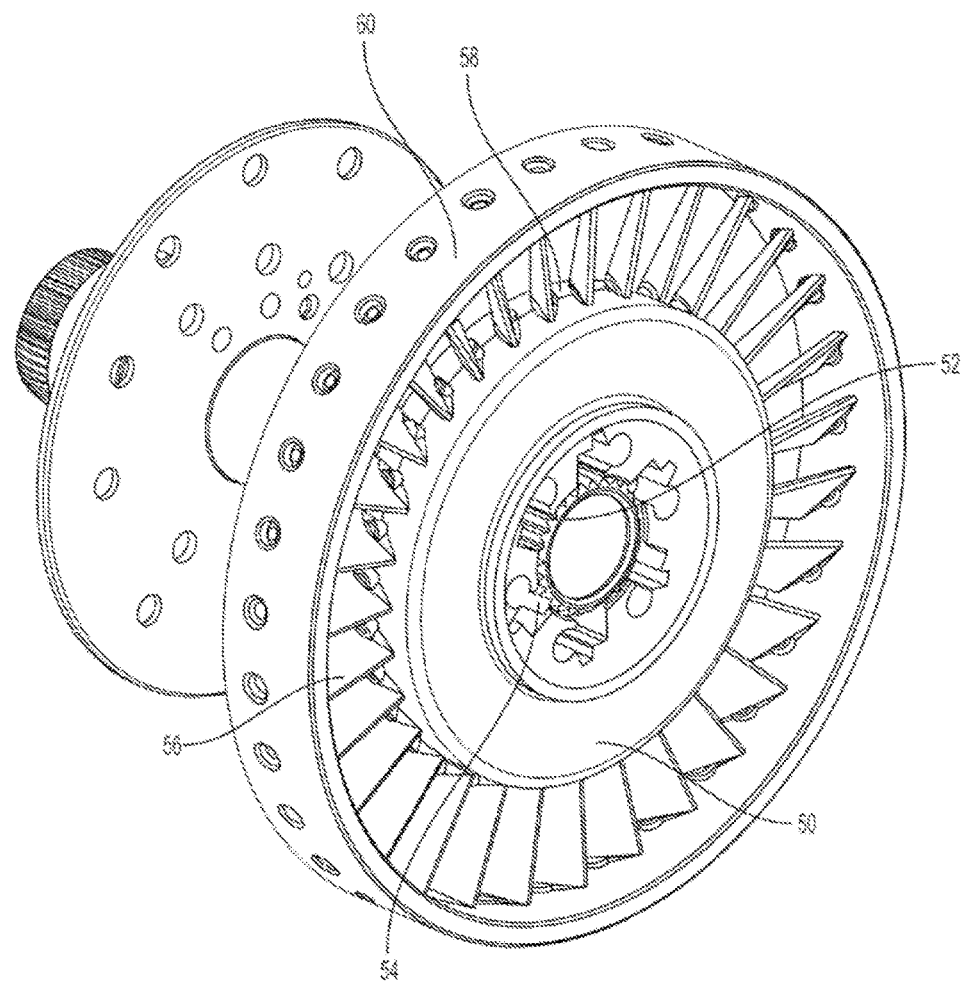
FIG. 3 is a pictorial view of a torque converter stator.

FIG. 3 shows a torque converter stator assembly with variable pitch blades integrated with a passive one way clutch. The assembly includes a stator hub 50 supported to rotate with respect to a stationary shaft 52. The stationary shaft 52 is adapted to be fixed to the front support of a transmission. A series of rockers 54 rotate with hub 50 and engage teeth on stationary shaft 52 to prevent rotation in one direction. A spring (not shown) forces the rocker into engagement with stationary shaft 52. The rockers are oriented such that they do not engage shaft 52 when hub 50 rotates in the opposite direction. Instead, teeth on the stationary shaft 52 force the rocker to briefly pivot and compress the spring. When the stator hub 50 rotates fast enough, centrifugal forces cause the rockers to pivot out of contact with the stationary shaft teeth, reducing parasitic drag torque. A number of stator blades 56 are pivotally supported by hub 50 in conjunction with inner locking ring 58 and outer ring 60. Other types of one way clutch designs are known. However, other types of one way clutch tend to require more axial length. The reduced axial length of the rocker one way clutch makes space available for the mechanism that controls the angle of the blades 46.

Figure 4:
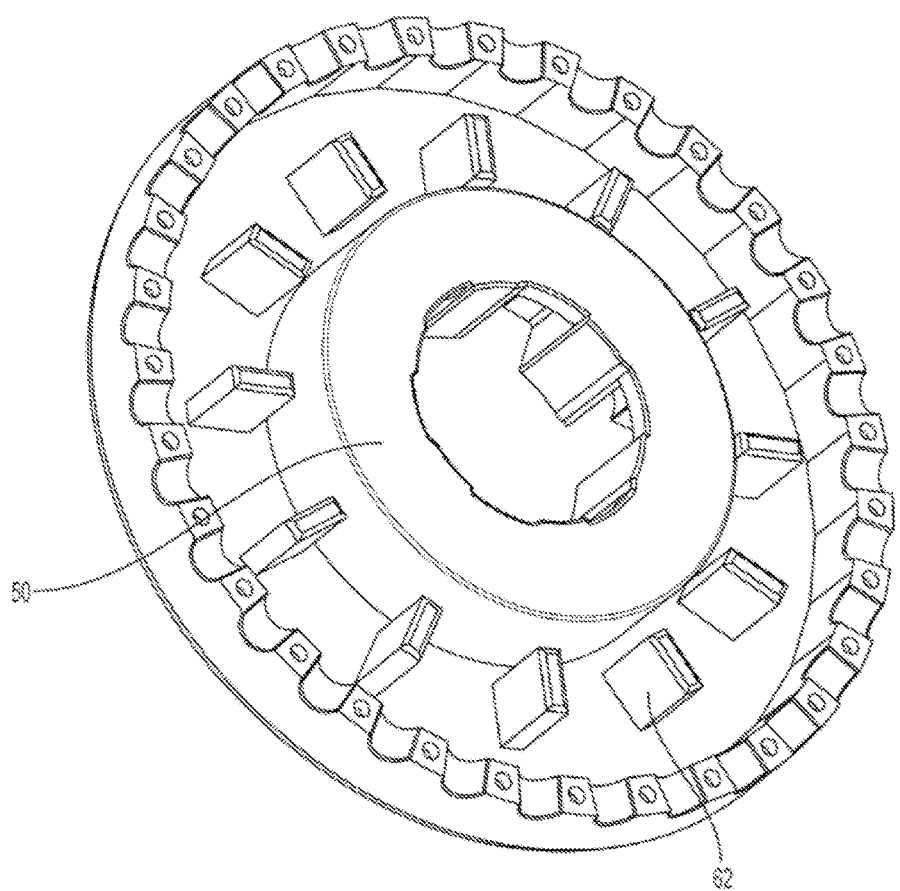
FIG. 4 is a pictorial view of a stator hub of the torque converter stator of FIG. 3.
Figure 5:
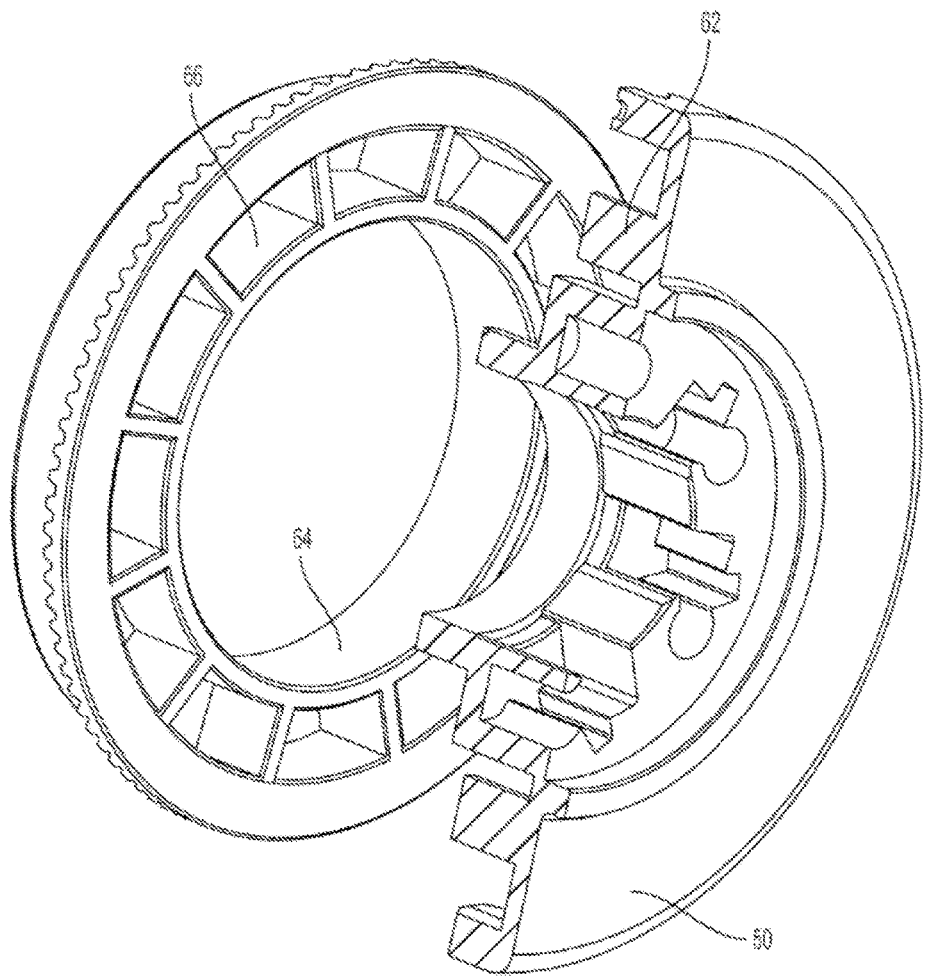
FIG. 5 is a partial cut-away exploded view of a stator hub and control ring of the torque converter stator of FIG. 3.

FIG. 4 shows the transmission side of the stator hub 50. A number of pitch control pistons 62 are formed into stator hub 50. FIG. 5 shows an exploded view of a cut-away of stator hub 50 and control ring 64. A number of pitch control chambers 66 are formed into control ring 64. The control ring 64 is assembled to the stator hub 50 such that each pitch control piston 62 fits into a corresponding pitch control chamber 66. Elastomeric material may be installed at the interface between control ring 62 and hub 50 to effectively seal each chamber. Each pitch control piston 62 divides each pitch control chamber 66 into two chambers, a tightening chamber and a loosening chamber. Elastomeric material may be installed on the pitch control piston to effectively seal the tightening and loosening chambers from one another. Control ring 62 is piloted on hub 50 such that it can rotate with respect to hub 50. As the control ring rotates with respect to the hub, the relative volumes of the tightening and the loosening chambers varies.

Figure 6:
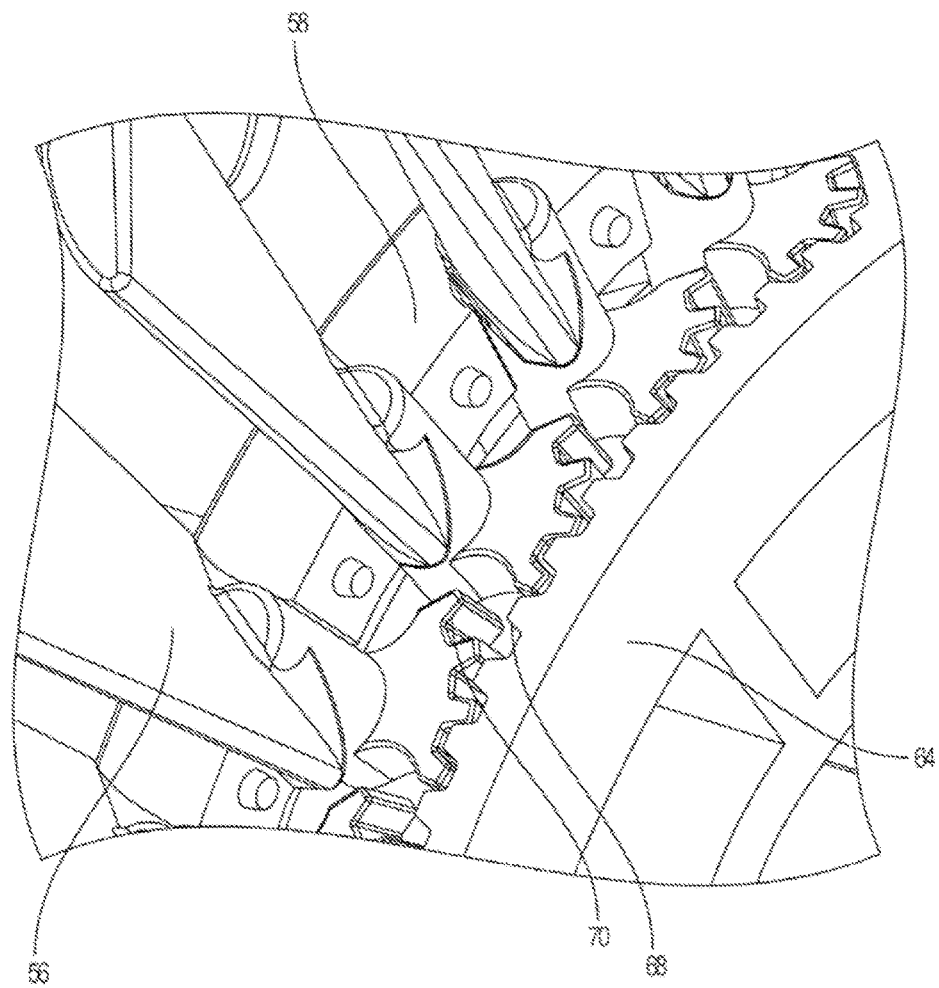
FIG. 6 is a close-up pictorial view of the control ring, locking ring, and stator blades of the torque converter stator of FIG. 3.

FIG. 6 shows a close-up view of the interface among control ring 64, locking ring 58, and the stator blades 56. Stator hub 50, which interfaces with locking ring 58 to support the blades 56, is not shown in this figure. Stator hub 50 and locking ring 58 are fixed to one another such that they rotate as a unit. A number of gear teeth 68 are formed into control ring 64. Gear teeth 68 mesh with gear teeth 70 on each stator blade 56. As the control ring 64 rotates with respect to the stator hub 50 and the locking ring 58, the meshing teeth force the blades 56 to rotate about their axes. This rotation of the stator blades changes the stiffness and torque multiplication characteristics of the torque converter.

The stator blade angle is controlled by varying the rotational position of control ring 64 with respect to stator hub 50. One or more springs may be installed between stator hub 50 and control ring 64 to bias the relative position toward a default relative position. For example, springs could be placed within one or more chambers tending to expand those chambers. Alternatively, a spring may be external to any chamber. Hydraulic fluid is then routed to the tightening and loosening chambers at controlled pressures. When the pressure of the fluid in the tightening chamber is increased relative to the pressure in the loosening chamber, the volume of tightening chambers increases varying the rotational position of the control ring 64 with respect to the stator hub 50.

Fluid flow past the stator blades may also exert torque on the stator blades. Depending on the location of the pivot axes, this torque may bias the blades towards a blade angle associated with a loose capacity characteristic or toward a blade angle associated with a tight capacity characteristic. This torque may vary as engine torque varies and/or as the torque converter speed ratio varies. Therefore, for some pressure differentials between the tightening chambers and the loosening chambers, stator blade pitch may vary as a function of engine torque and/or torque converter speed ratio.

The controller may consider many factors to determine the desired blade angle for various operating conditions. For example, a combination of low vehicle speed and high power demand, as indicated by accelerator pedal position, may call for a blade angle that produces maximum torque multiplication and a loose characteristic. Internal combustion engines may be capable of generating more torque at higher engine speed and a looser characteristic results in higher engine speeds than a tight characteristic. As the vehicle accelerates, the controller may gradually change the blade angle to tighten the characteristic capacity, preventing the engine from continuing to accelerate past its maximum torque speed. On the other hand, at lower torque demand, a tighter characteristic may result in a lower engine speed at which the engine and torque converter are both more efficient, reducing fuel consumption.

During cruise, the torque converter bypass clutch is typically engaged to avoid the parasitic losses associated with an open converter. However, various events, such as certain shifts, may require disengagement. With a torque converter characteristic optimized for launch, or even as a compromise of other operating conditions, the slip across an open converter in cruise conditions can be considerable. Excessive slip is disadvantageous for two reasons. First, more slip increases the parasitic losses of the converter increasing fuel consumption. Second, it is more difficult to re-lock the converter, so the controller may operate the converter in the open mode longer while waiting for an opportunity to lock it back up again. With a variable pitch stator, the controller can command a tight characteristic for these temporary unlock events. If the nature of the event for which the unlock is commanded requires a looser characteristic, the controller can command the looser characteristic during the event and then command a tighter characteristic to facilitate re-locking.

Several functions of the torque converter of FIGS. 2-6 require a supply of fluid. In addition to the fluid used to control stator blade pitch, as described above, fluid pressure may be utilized to command engagement of bypass clutch 42. Furthermore, fluid is required for the hydro-dynamic torque transfer mechanism of the fluid coupling. In order to dissipate the heat that is generated, this fluid may be continuously exchanged such that the fluid may be routed to a heat cooler. Control is conceptually simplest if separate fluid passages are provided for each separate function. However, it is challenging to provide a large number of separate fluid passageways. Therefore, it is desirable to find ways to have a single fluid passageway service multiple functions if it can be accomplished without excessive functional interactions.

Figure 7:
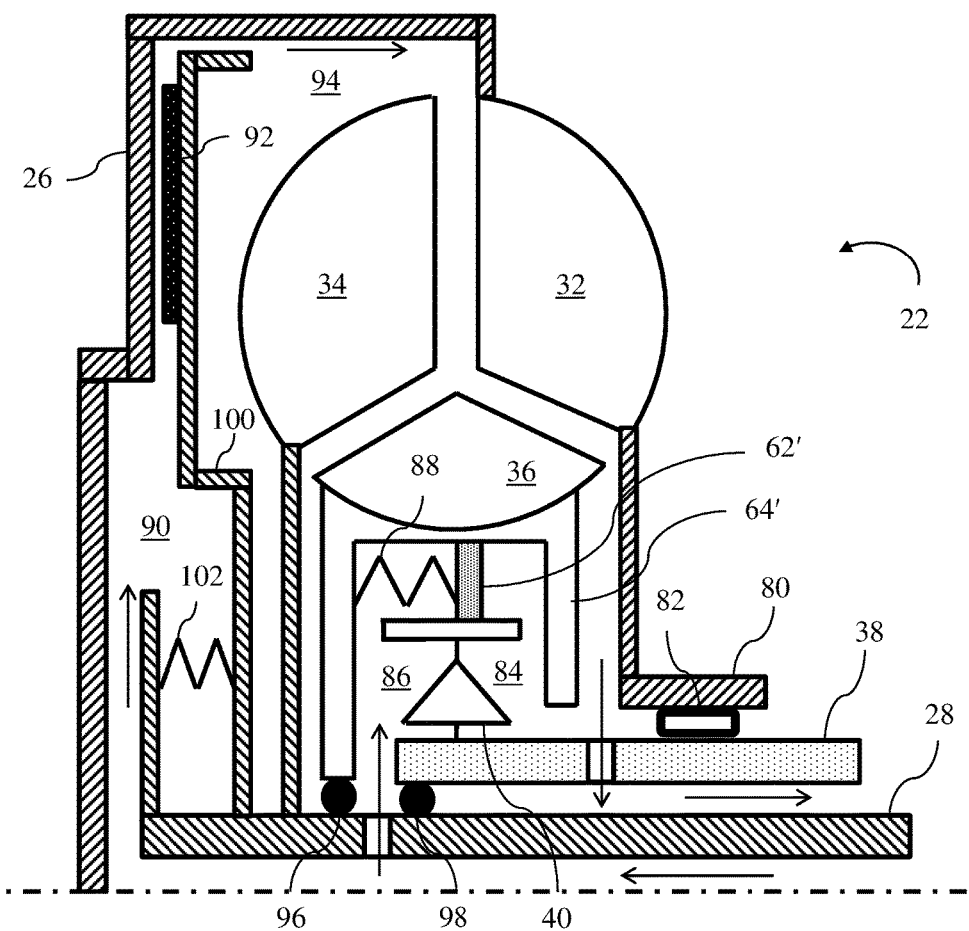
FIG. 7 is a schematic cross section of a first torque converter assembly configured to control a bypass clutch and stator pitch using two fluid passages.

FIG. 7 illustrates a torque converter with a variable pitch stator and a bypass clutch both controlled by a total two fluid passageways. Impeller 32 is fixedly coupled to transmission input 26 and to pump shaft 80. Pump shaft 80 is supported on hollow stator shaft 38 by bearings 82. Turbine shaft 28 is supported for rotation within hollow stator shaft 38 and is fixedly coupled to turbine 34. Stator 36 is supported for rotation with respect to stator shaft 38 and is selectively coupled to stator shaft 38 by one way clutch 40. Although pitch control piston 62 rotates with respect to control ring 64 as described above, axial equivalents of these components 62' and 64' are shown in FIG. 7. When piston 62' moves to the left, the pitch of the stator blades move to a position associated with a tighter characteristic, the volume of tightening chamber 84 increases, and the volume of loosening chamber 86 decreases. Spring 88 biases piston 62' toward a loose pitch position.

Arrows in FIG. 7 indicate the direction of fluid flow when the bypass clutch is disengaged. Fluid flows from a valve body, through an axial passageway in turbine shaft 28, to release chamber 90. From there, it flows past friction material 92 into apply chamber 94. The gap between friction material 92 and input 26 is small enough to cause a pressure drop between release chamber 90 and apply chamber 94. From apply chamber 94, the fluid flows between impeller 32 and turbine 34 into the hydrodynamic chamber. Fluid flows out of the hydrodynamic chamber between the stator 36 and the impeller 32. From there, the fluid flows through a hole in stator shaft 38 and back to the valve body between the stator shaft and the turbine shaft. Tightening chamber 84 is fluidly connected to the passageway between the stator shaft and the turbine shaft. Two chambers are fluidly connected if the flow resistance between them is small enough that they can be considered to have substantially the same pressure. Conversely, chambers connected by small orifices or by a pump are not fluidly connected even though fluid may flow between them. Loosening chamber 86 is fluidly connected to the release chamber 90 be a hole in turbine shaft 28. At the interface between shafts that rotate at different speeds, the passageway between release chamber 90 and loosening chamber 86 is defined by seals 96 and 98 which isolates this passageway from other chambers. Piston 100 is held in the disengaged position by the pressure difference between release chamber 90 and apply chamber 94 and also by return spring 102.

Figure 8:
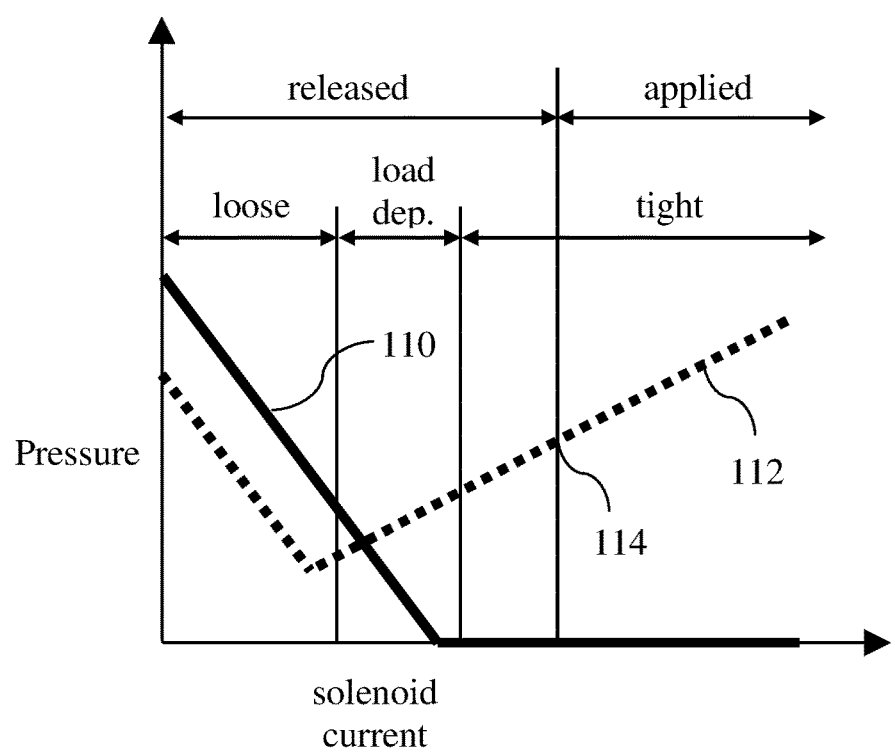
FIG. 8 is a graph illustrating the pressures in the two fluid passages of the torque converter assembly of FIG. 7 as a function of a single solenoid current.

FIG. 8 illustrates how the controller commands a stator pitch and clutch capacity for the torque converter of FIG. 7. The controller commands a solenoid current. In response to this solenoid current, one or more valves in the valve body adjust the fluid pressures in two circuits. The pressure in the first circuit, which is fluidly connected to release chamber 90 via the center of turbine shaft 28, follows curve 110. The pressure in the second circuit, which is fluidly connected to tightening chamber 84 via the space between turbine shaft 28 and stator shaft 38, follows curve 112.

At zero current, the pressure in the first circuit forces piston 100 to the released position and forces piston 62' to the loose pitch position. The pressure in the second circuit is less than the pressure in the first circuit due to fluid resistance past the piston. As the solenoid current increases, both pressures decrease at the same rate until a threshold is reached. Beyond the threshold, the valve body starts to increase the pressure in the second circuit as solenoid current increases. The pressure balance on piston 62' is such that hydrodynamic forces may move the stator pitch away from loosest position for some engine torques and speed ratios. This is called a load dependent region. As the solenoid increased further, a point is reached at which the pressure balance on piston 62' forced the stator pitch to the tightest position for all engine torques and speed ratios. The spring rate of return spring 88 is selected such that these transition thresholds are appropriate. When the solenoid current is increased further yet, a point 114 is reached at which the pressure in the apply chamber 94 exceeds the pressure in the release chamber 102 by enough to overcome return spring 102 and push piston 100 into the engaged position. Increasing solenoid pressure beyond this point increased clutch torque capacity.

Figure 9:
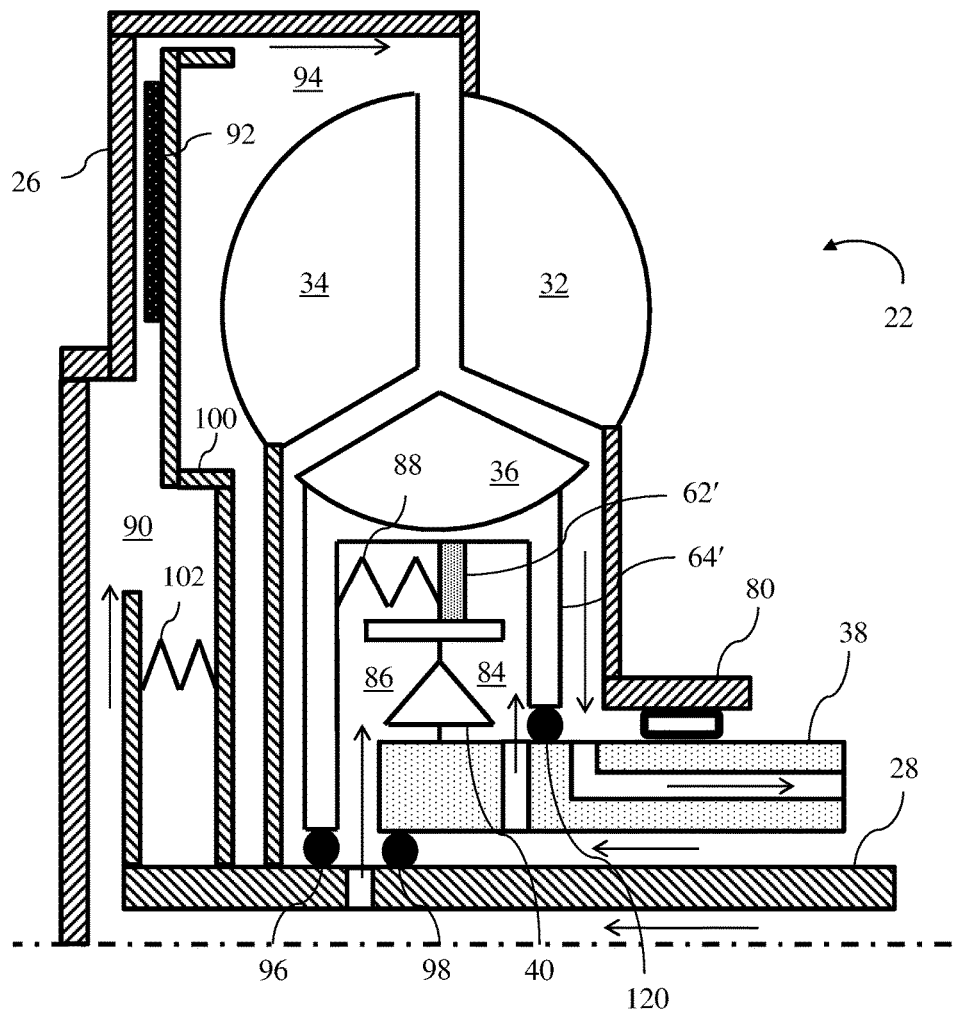
FIG. 9 is a schematic cross section of a second torque converter assembly configured to control a bypass clutch and stator pitch using three fluid passages.

FIG. 9 illustrates a torque converter with a variable pitch stator and a bypass clutch which can be independently controlled by a total three fluid passageways. The additional passageway is formed within stator shaft 38 which requires stator shaft 38 to have a wider cross section than in FIG. 7. Although FIG. 9 shows the cross section of stator shaft 38 as having the same thickness for its entire length, a variable thickness cross section may be preferable in some circumstances. Fluid returning from the hydrodynamic chamber when the clutch is disengaged or entering the hydrodynamic chamber when the clutch is applied is routed through this new passageway. Fluid is routed to tightening chamber 84 via the fluid passageway between stator shaft 38 and turbine shaft 28 and then through a hole in turbine shaft 28. Seal 120 separates these two passageways.

Figure 10:
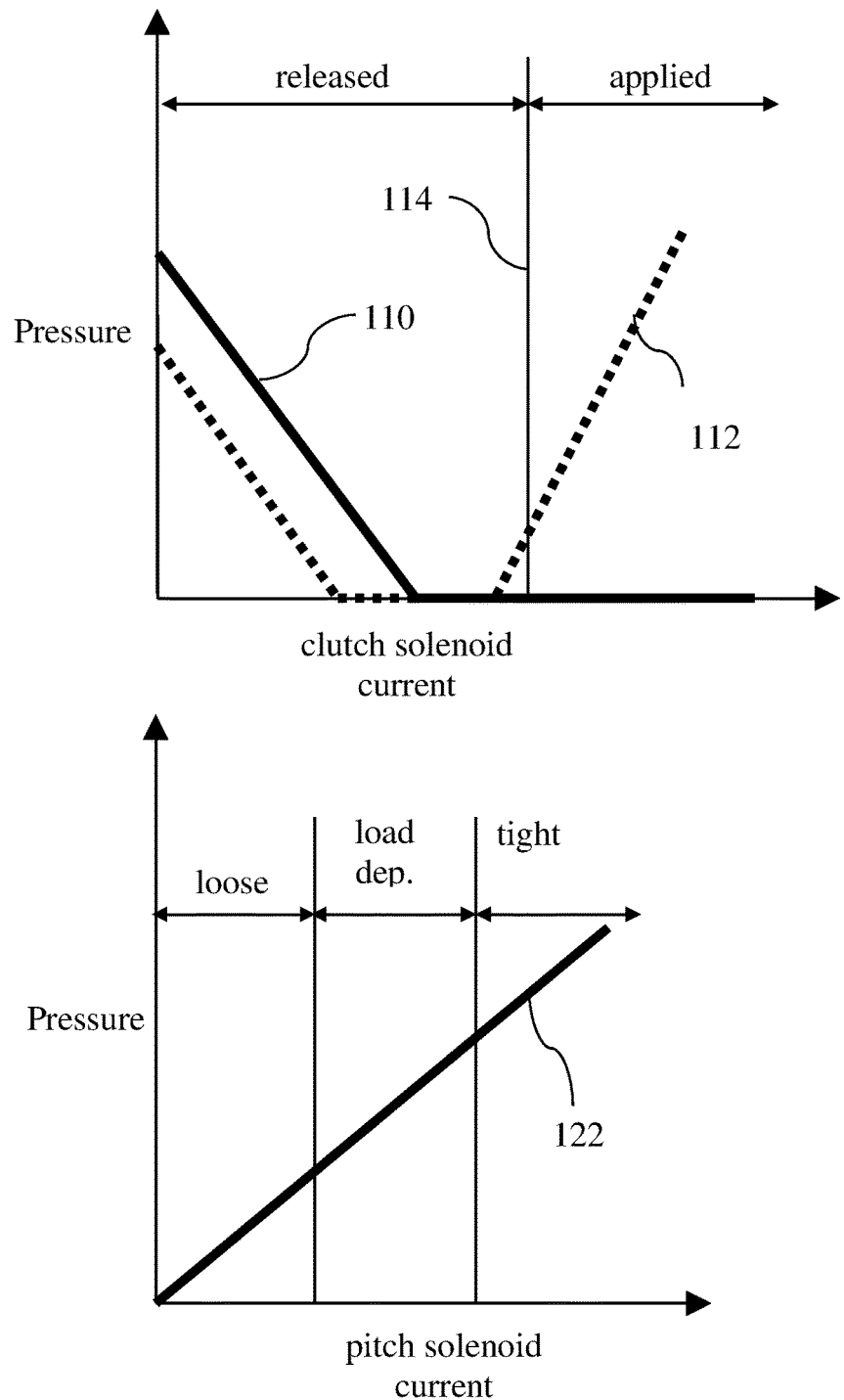
FIG. 10 is a pair of graphs illustrating the pressures in the three fluid passages of the torque converter assembly of FIG. 9 as a function of two solenoid currents.

FIG. 10 illustrates how the controller commands a stator pitch and clutch capacity for the torque converter of FIG. 9. The controller commands two solenoid currents. In response to these solenoid currents, valves in the valve body adjust the fluid pressures in three circuits. The pressure in the first circuit, which is fluidly connected to release chamber 90 via the center of turbine shaft 28, follows curve 110. The pressure in the second circuit, which is fluidly connected to hydrodynamic chamber via the stator shaft follows curve 112. The pressure in apply chamber 94 tracks the pressure in the second circuit subject to any impact of impeller 32. To disengage the clutch, the controller sets the clutch solenoid current to zero. To apply the clutch, the controller increases the clutch solenoid current. When pressure 112 exceeds pressure 110, the direction of fluid flow reverses. To the right of line 114, the clutch torque capacity increases as clutch solenoid current increases. The position of line 114 can be adjusted by selecting an appropriate spring rate for spring 102. Spring 102 is optional in this configuration.

The pressure in a third circuit, which is fluidly connected to tightening chamber 84 via the gap between stator shaft 38 and turbine shaft 28, follows curve 122. The controller adjusts pitch solenoid current to adjust the pitch of the stator blades. The controller can adjust the stator blade pitch regardless of the state of the clutch. However, the boundaries between the loose, load dependent, and tight ranges are dependent on the pressure in the first circuit, so the controller must compensate accordingly.

Figure 11:
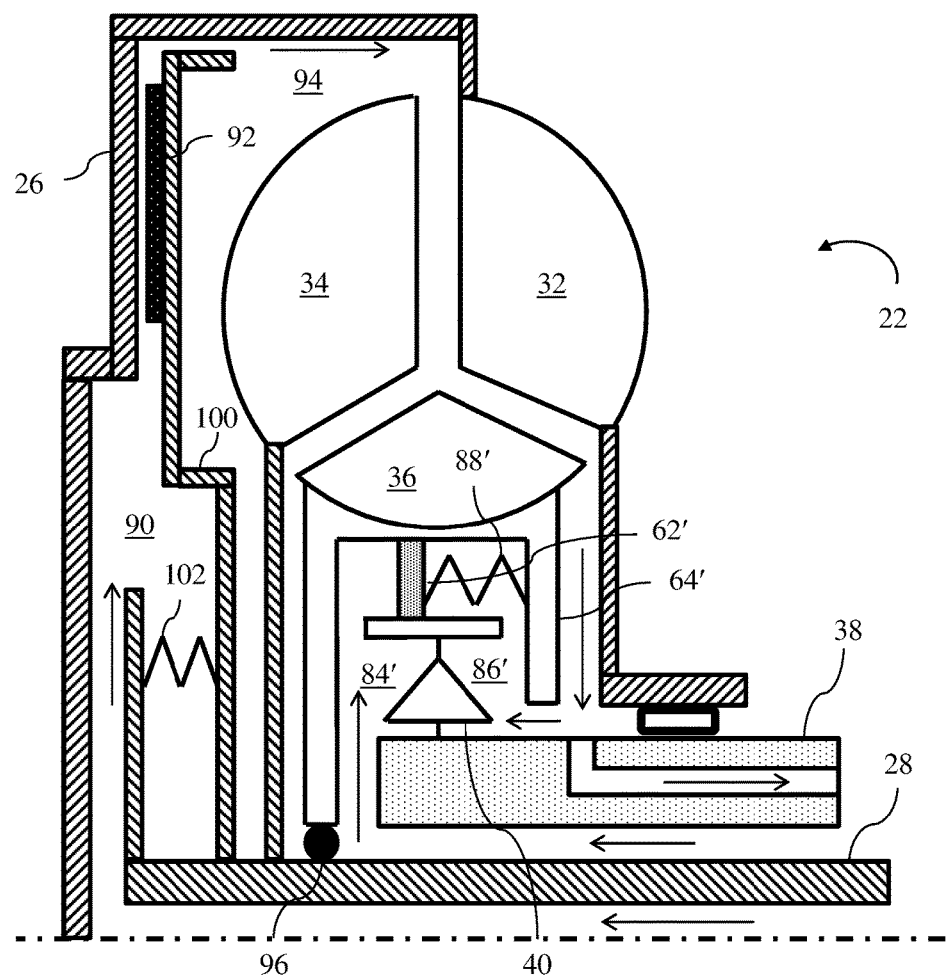
FIG. 11 is a schematic cross section of a third torque converter assembly configured to control a bypass clutch and stator pitch using three fluid passages.

FIG. 11 illustrates a torque converter with a variable pitch stator and a bypass clutch which can be independently controlled by a total three fluid passageways. Whereas the loosening chamber 86 in FIGS. 7 and 9 are fluidly connected to the release chamber 90, loosening chamber 86' in FIG. 11 fluidly connected to the passageway through which fluid returns from the hydrodynamic chamber when the clutch is disengaged. Operation of the converter of FIG. 11 is similar to operation of the converter of FIG. 9. However, the boundaries between the loose, load dependent, and tight ranges are dependent on pressure 112 as opposed to pressure 110. Since pressure 112 tends to be near zero for many of the conditions in which the controller would adjust stator pitch, less compensation is required.

Figure 12:
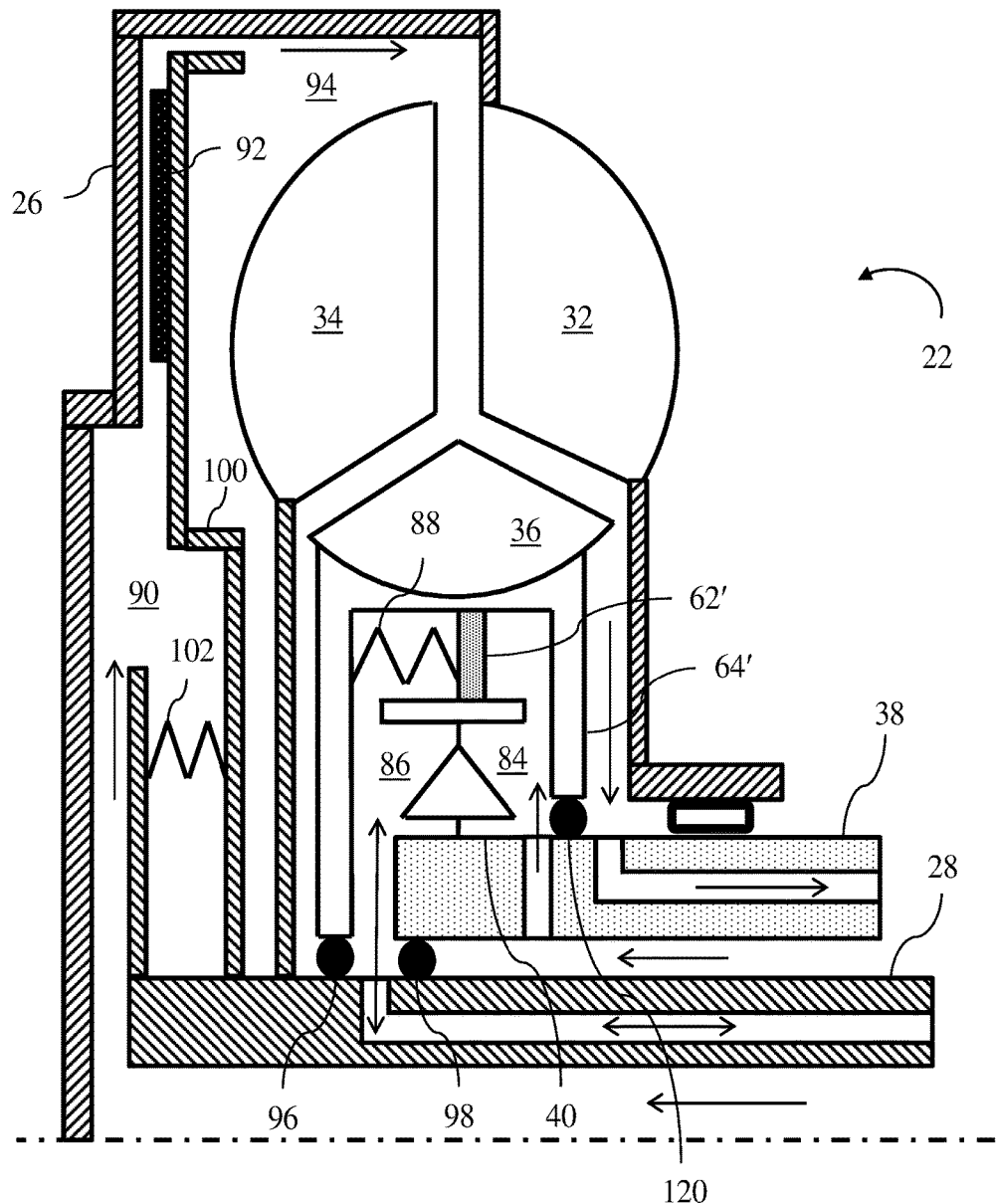
FIG. 12 is a schematic cross section of a fourth torque converter assembly configured to control a bypass clutch and stator pitch using four fluid passages.

FIG. 12 illustrates a torque converter with a variable pitch stator and a bypass clutch which can be independently controlled by a total four fluid passageways. In FIG. 12, loosening passageway 86 is fluidly connected to a fourth passageway. This passageway may be form by an insert in turbine shaft 28 that divides the shaft into multiple passageways. The controller maintains the pressure in this passageway at a low and relatively constant pressure, typically less than 20 psi. For example, this passageway may be connected to the lubrication circuit of the transmission. Otherwise, operation of the converter of FIG. 12 is similar to operation of the converter of FIG. 9. Since the pressure in loosening chamber 86 is independent of pressures 110 and 112, no compensation is required.

Figure 13:
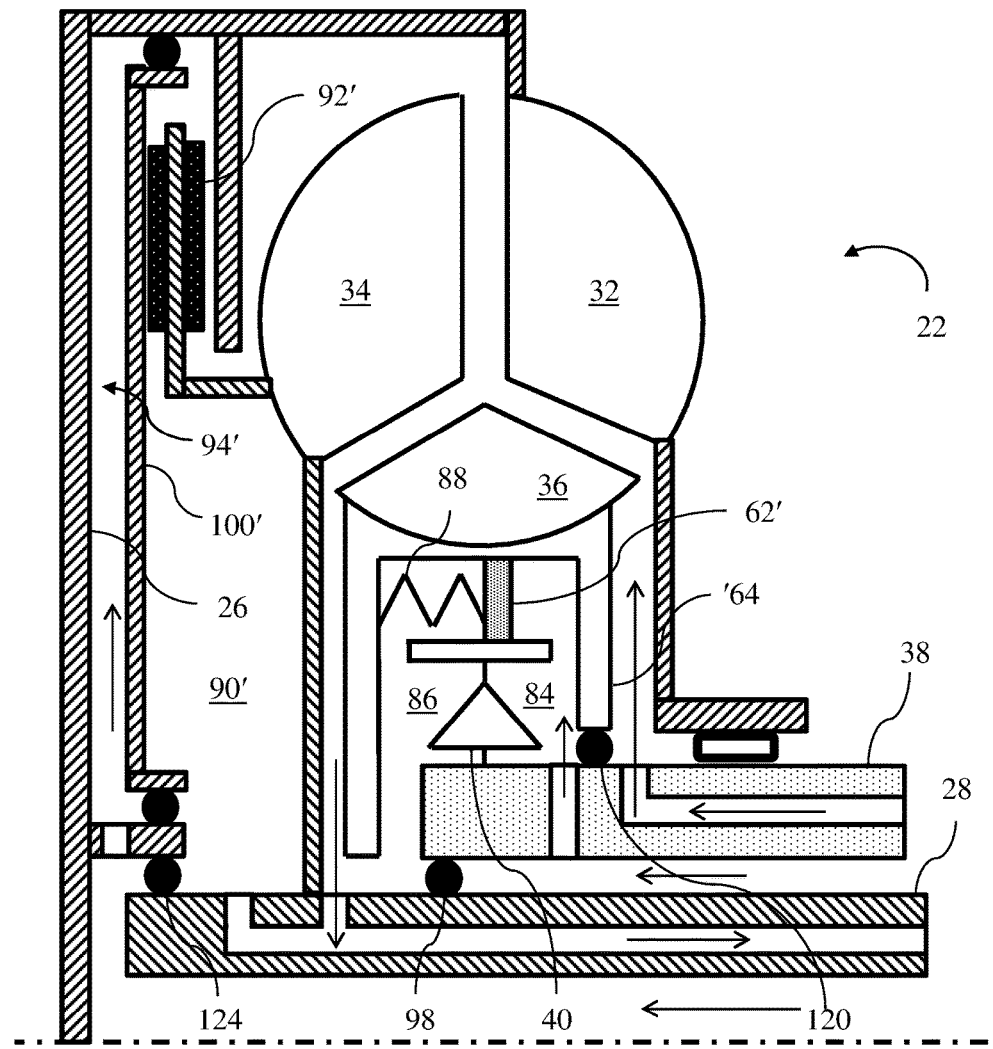
FIG. 13 is a schematic cross section of a fifth torque converter assembly configured to control a bypass clutch and stator pitch using four fluid passages.

FIG. 13 illustrates a torque converter with a variable pitch stator and a closed piston bypass clutch. A closed piston clutch permits separation of the functions of exchanging the fluid in the hydrodynamic chamber and controlling the torque capacity of the bypass clutch. Fluid is continuously provided to the hydrodynamic chamber between the stator and the impeller via a passageway in the stator shaft 38. Fluid is continuously removed from the hydrodynamic chamber between the stator and the turbine via a passageway in the turbine shaft. The direction of flow does not change when the state of the bypass clutch changes. Piston 100' rotates with the transmission input 26 as opposed to rotating with the turbine. Fluid is routed to apply chamber 94' via a passageway through the turbine shaft. Seal 124 isolates this passageway from other chambers at an interface between input 26 and turbine shaft 28. Release chamber 90' and loosening chamber 86 are fluidly connected to the hydrodynamic chamber return circuit.

Figure 14:
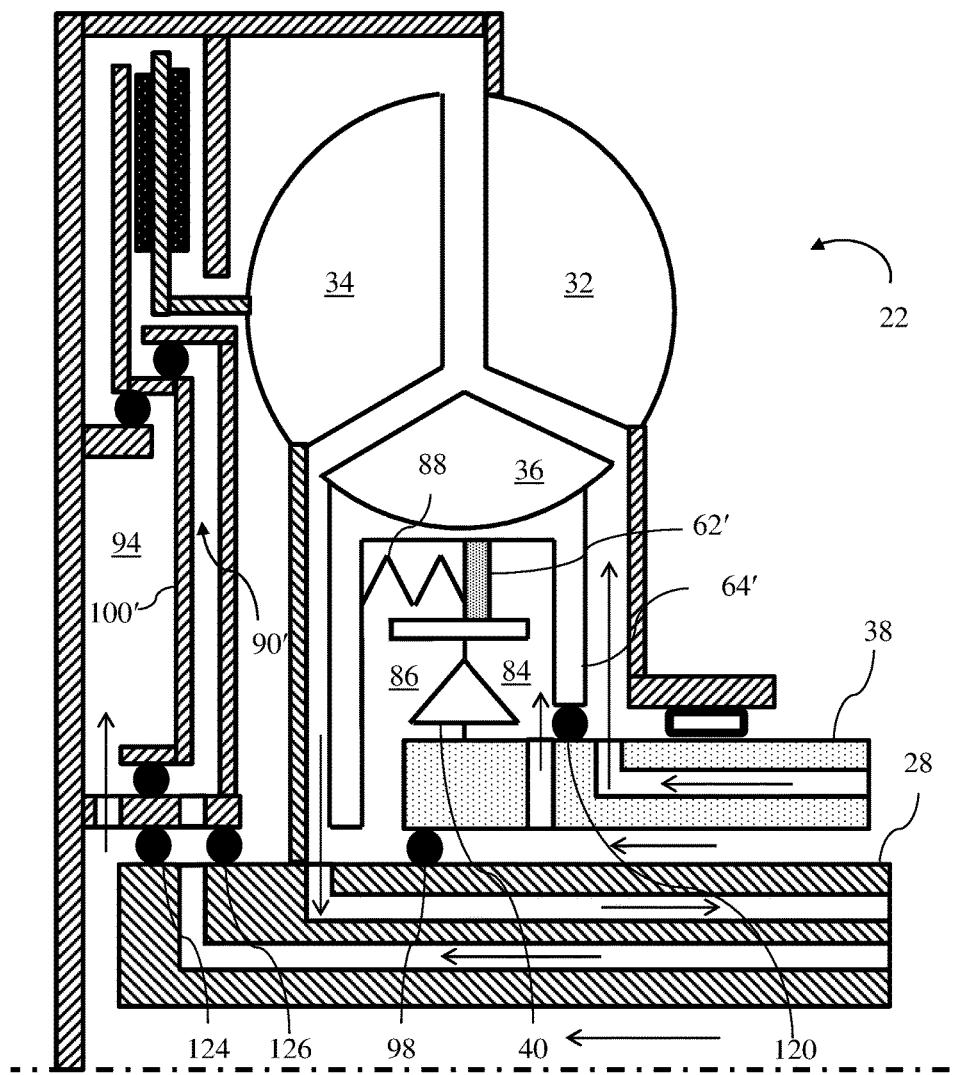
FIG. 14 is a schematic cross section of a sixth torque converter assembly configured to control a bypass clutch and stator pitch using five fluid passages.
Figure 15:
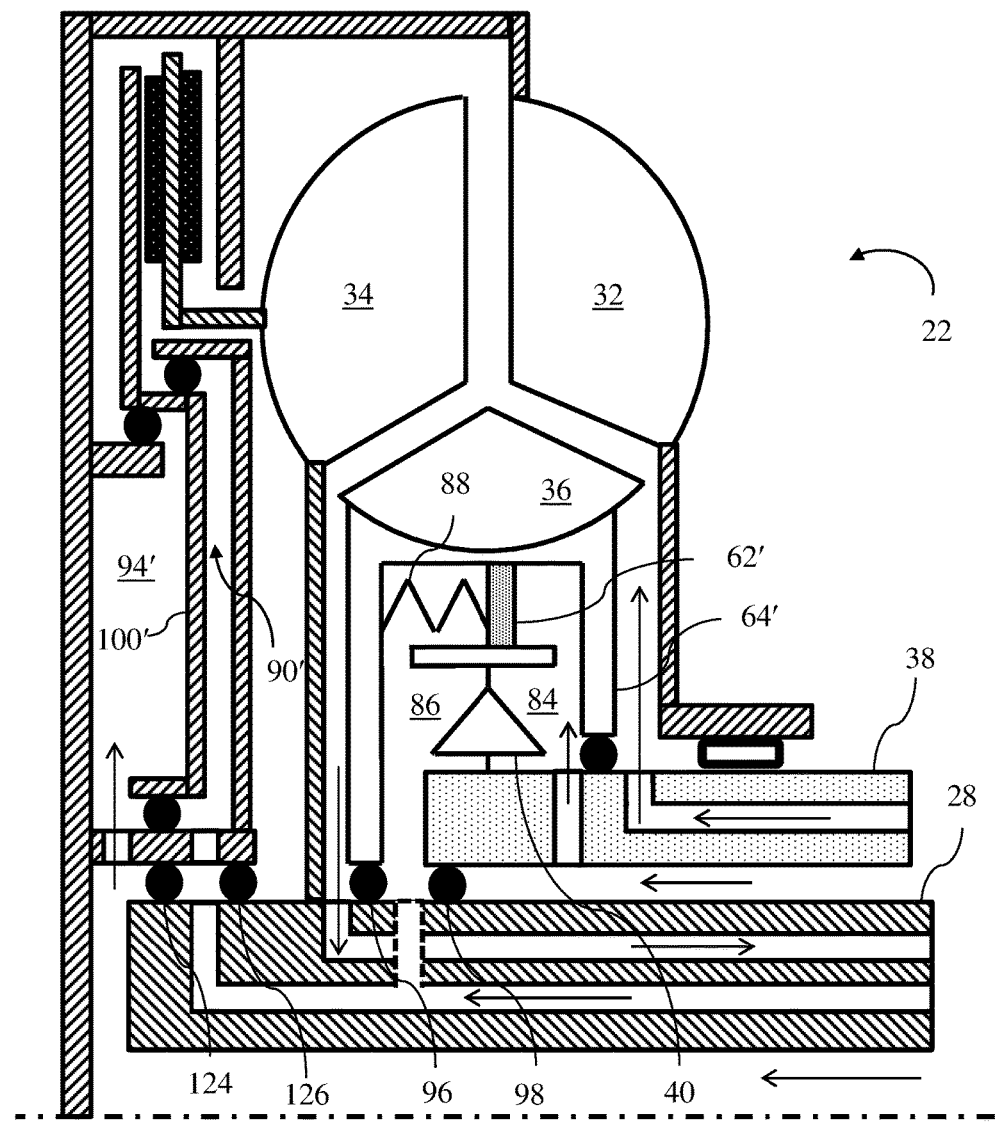
FIG. 15 is a schematic cross section of a seventh torque converter assembly configured to control a bypass clutch and stator pitch using five fluid passages.

The pressure in the hydrodynamic chamber return circuit is relatively stable, minimizing the need for the controller to compensate when adjusting bypass clutch torque capacity or stator blade pitch. However, fluid from this circuit may be used for downstream purposes such as filling the balance chambers of shifting clutches in the gearbox. The pressure may fluctuate to some extent due to those functions. In the torque converter of FIG. 14, release chamber 90' is fluidly connected to an elevated exhaust vent via an additional passageway in the turbine shaft, isolating the bypass clutch from the impact of these downstream purposes. Seal 126 defines this additional passageway at the interface between the turbine shaft and transmission input 26. In the torque converter of FIG. 15, loosening chamber 86 is also fluidly connected to the elevated exhaust vent. In FIGS. 14 and 15, fluid in apply chamber 94' and fluid in release chamber 90' tend to rotate with the transmission input. This rotation results in pressure due to centrifugal forces. However, since the fluid in the two chamber rotates at the same speed and the two chambers have very similar dimensions, these centrifugal pressures counteract one another to produce negligible net force.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A torque converter comprising:
   an impeller;
   a turbine;
   a stator having blades;
   a clutch configured to selectively couple the turbine to the impeller in response to a pressure difference between a first hydraulic circuit and a second hydraulic circuit; and
   an actuator configured to adjust an orientation of the blades in response to a pressure difference between the second hydraulic circuit and a third hydraulic circuit.

2. The torque converter of claim 1 wherein:
   the first hydraulic circuit is fluidly connected to a hydrodynamic chamber which is fluidly connected to a clutch apply chamber;
   the second hydraulic circuit is fluidly connected to a clutch release chamber and to a stator loosening chamber; and
   the third hydraulic circuit is fluidly connected to a stator tightening chamber.

3. The torque converter of claim 1 wherein:
   the first hydraulic circuit is fluidly connected to a clutch release chamber;
   the second hydraulic circuit is fluidly connected to a stator loosening chamber and fluidly connected to a hydrodynamic chamber which is fluidly connected to a clutch apply chamber; and
   the third hydraulic circuit is fluidly connected to a stator tightening chamber.

4. A torque converter comprising:
   an impeller;
   a turbine;
   a stator having blades;
   a clutch configured to selectively couple the turbine to the impeller in response to a pressure difference between an apply chamber and a release chamber; and
   an actuator configured to adjust an orientation of the blades in response to a pressure difference between a tightening chamber and a loosening chamber wherein the loosening chamber is fluidly connected to the release chamber.

5. The torque converter of claim 4 wherein the apply chamber is fluidly connected to a hydrodynamic chamber which is fluidly connected to the tightening chamber.

6. The torque converter of claim 5 wherein the clutch comprises:
   a piston fixedly coupled to the turbine and configured to apply normal force to a friction interface fixedly coupled to the impeller to engage the clutch; and
   a return spring biasing the piston towards a disengaged position.

7. A transmission comprising:
   a torque converter including an impeller, a turbine, and a stator, the stator having a plurality of blades;
   a clutch configured to selectively couple the turbine to the impeller in response to a first pressure difference between an apply chamber and a release chamber; and
   an actuator configured to adjust an orientation of the blades in response to a second pressure difference between a tightening chamber and a loosening chamber.

8. The transmission of claim 7 further comprising:
   a valve body configured to adjust the first pressure difference and, while the clutch is commanded to a disengaged state, adjust the second pressure difference to change orientation of the blades between a loose orientation and a tight orientation.

9. The transmission of claim 8 wherein the release chamber is fluidly connected to the loosening chamber.

10. The transmission of claim 9 wherein the tightening chamber is fluidly connected to a hydrodynamic chamber which is fluidly connected to the apply chamber.

11. The transmission of claim 10 wherein the clutch comprises:
    a piston fixedly coupled to the turbine and configured to apply normal force to a friction interface fixedly coupled to the impeller to engage the clutch; and
    a return spring biasing the piston towards a disengaged position.

12. The transmission of claim 11 wherein the valve body is configured to:
    receive a command value from a controller;
    in response to a command value less that a first threshold, decrease a fluid pressure in the loosening chamber as the command value increases to bias the actuator towards the tight orientation; and
    in response to a command value greater than a second threshold, increase a fluid pressure in the apply chamber as the command value increases to bias the actuator toward the loose orientation and to engage the clutch.

13. The transmission of claim 12 wherein the command value is defined by an electrical current to a solenoid which increases in magnitude as the command value increases.

14. The transmission of claim 8 wherein the loosening chamber is fluidly connected to a hydrodynamic chamber which is fluidly connected to the apply chamber.

* * * * *